No. 724,738. PATENTED APR. 7, 1903.
E. C. RISHEL.
NECK YOKE AND POLE CONNECTION.
APPLICATION FILED AUG. 29, 1902.
NO MODEL.
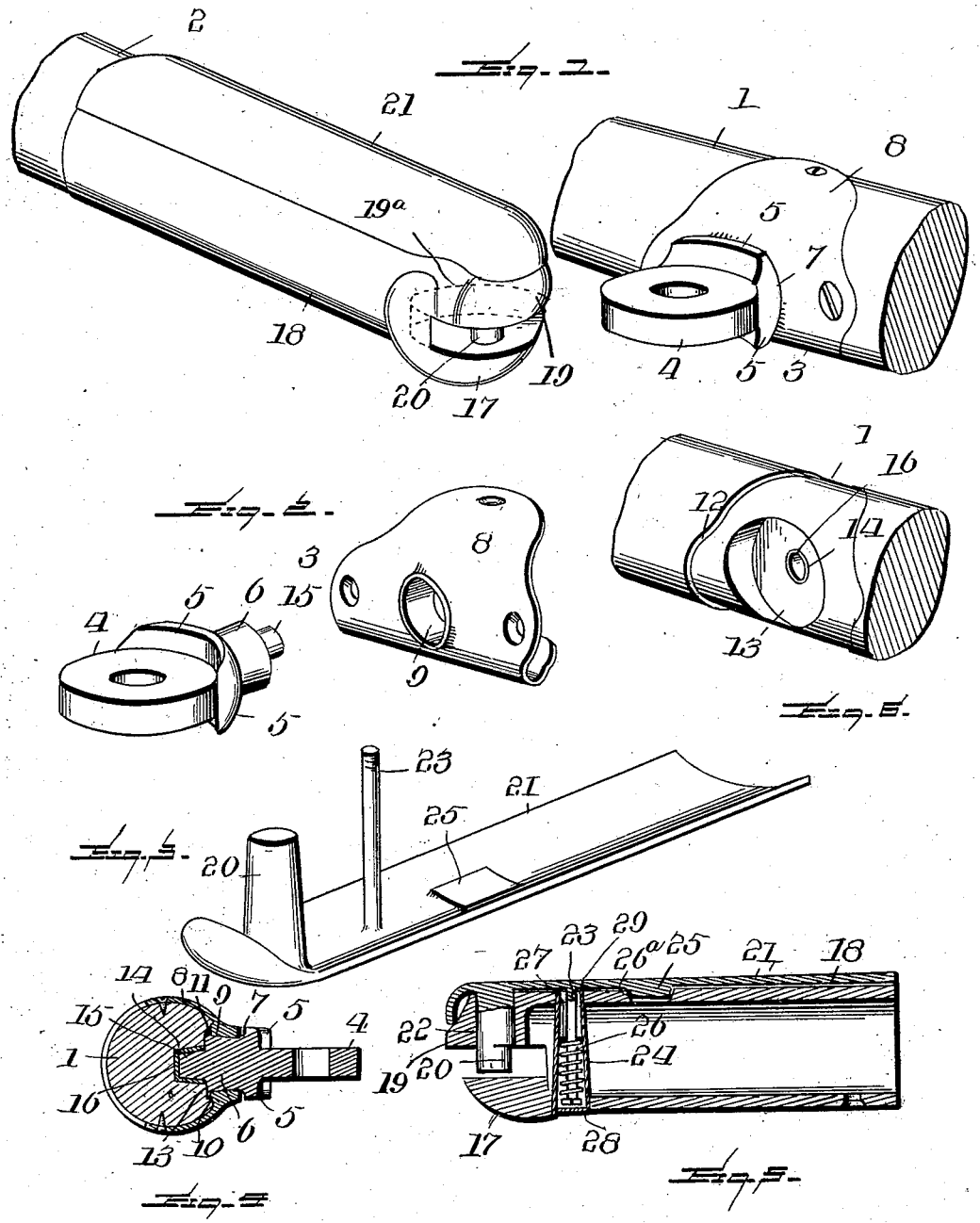
WITNESSES:
Elias Clark Rishel, INVENTOR
BY
Herrick & Herrick, Attorneys

UNITED STATES PATENT OFFICE.

ELIAS CLARK RISHEL, OF ATHENS, PENNSYLVANIA.

NECK-YOKE AND POLE CONNECTION.

SPECIFICATION forming part of Letters Patent No. 724,738, dated April 7, 1903.

Application filed August 29, 1902. Serial No. 121,458. (No model.)

*To all whom it may concern:*

Be it known that I, ELIAS CLARK RISHEL, a citizen of the United States, residing at Athens, in the county of Bradford and State of Pennsylvania, have invented certain new and useful Improvements in Neck-Yoke and Pole Connections; and I do hereby declare the following to be a full, clear, and exact description of the invention, such as will enable others skilled in the art to which it appertains to make and use the same.

This invention relates to neck-yoke and pole connections; and it consists in a special construction and combination with the same of certain pivotal connections uniting the neck-yoke with the pole, substantially as herein described, and more particularly pointed out in the claims, and whereby many advantages are secured over the ordinary neck-yoke and its connection with the pole, as hereinafter explained.

It has for its object to provide a device in which while the neck-yoke can be detached quickly at will yet should the traces become unfastened the neck-yoke cannot be detached from the pole, thereby decreasing the danger which naturally follows from such unfastening of the traces.

Reference is to be had to the accompanying drawings, forming a part of this specification, in which similar figures of reference indicate corresponding parts in all the views.

Figure 1 is a perspective view of portions of a vehicle-pole and of a neck-yoke with the connection applied to them, but having its two members separated. Fig. 2 is a perspective view of the swiveled eye member, showing its component parts separated. Fig. 3 is a perspective view of the plate. Fig. 4 is a vertical longitudinal sectional view of the eye member with its parts assembled. Fig. 5 is a vertical longitudinal sectional view of the pole member. Fig. 6 is a perspective view of a portion of the neck-yoke, omitting the swiveled eye member.

1 designates the neck-yoke, and 2 the vehicle-pole. Mounted upon the neck-yoke 1 is the swiveled eye member 3, which consists of the disk or eye portion 4, having projecting from both sides thereof a segmental body portion 5, one surface of which forms a circular arc, and a cone-shaped bearing 6 is connected to the side of the body portion 5 by a sloping wall 7. For securing the eye to the neck-yoke an attaching-plate 8 is provided, having an opening 9, into which the cone-shaped bearing 6 is fitted, and surrounding this opening upon the inner side of the attaching-plate is the annular projection 10. When the cone-shaped bearing is fitted into the opening of the attaching-plate, the end of said bearing projects slightly from the annular projection 10, and to hold the parts together the said projecting portion of the bearing is hammered back upon the annular projection 10, so as to form an annular lug 11. The neck-yoke is cut to form a seat 12 for the attaching-plate, and a large socket 13 is also provided, into which the annular projection 10 upon the inner side of the plate fits, thereby preventing lateral movement of the attaching-plate 8 and consequent stress upon the attaching-screws. The cone-shaped bearing 6 is provided with a tapered arbor extension 15, smaller in diameter than the cone-shaped bearing, and this arbor extension fits into a brass bushing 16, which is itself fitted into a second socket 14 in the neck-yoke. This particular mounting of the eye member is provided to relieve the attaching-plate of most of the strain to which it would be otherwise subjected and also to provide a swiveled eye in which the friction is a minimum.

The eye member 4 is received within the bifurcated end 17 of the pole member 2, which end is preferably incased by a ferrule or cap 18, the end of which is rounded, as at 19, and bears against the segmental body portion 5 of the eye member when said member is secured within said bifurcation. The bifurcation of the cap 18 only extends about one-half the diameter of the eye or disk 4 and then opens into a receptacle or socket 19ª, being in shape the counterpart of half the disk 4, the combined bifurcation and socket being commensurate with the disk 4. It will thus be seen from this peculiar construction of the ferrule or cap 18 that the inner wall of the socket forms a bearing for the periphery of the eye member. To guard against accidental detachment of the two members, I provide a pin 20, which is secured to a plate 21, mounted on the cap 18, and projects through a perforation 22 in the upper part of said cap. In actual use my connection may be used either with or without the pin, as the latter serves merely as a safety attachment. By this arrangement it will be readily seen that the eye member 4 oscillates upon its periphery instead of upon the pin for a pivotal center. The advantages thus derived are, first, the gradual wearing out of the pin or bolt, which is the case with other attachments where an eye is used without other means of connection, is entirely prevented, since I get a wearing-surface in said socket and upon the rounded end of the cap so large that deleterious wear is absolutely prevented; secondly, the socket arrangement renders the eye member self-centering—that is, when merely pressed backward the pin goes in place and completes the lock without any guidance for the purpose—and it is impossible to use it without a perfect lock, no matter how careless the operator may be, and, thirdly, the fact that the rounded end of the cap engages the segmental body portion of the eye at the same time the walls of the socket engage a portion of the periphery of the eye at the opposite side absolutely prevents rattle when in use. The plate 21 is provided with an integral bolt 23, which extends into a spring-housing 24, mounted in an opening in the cap 18, and to hold the plate against lateral movement an integral stud 25 projects into another opening 26 in said cap.

The spring-housing which is herein shown is adapted to protect the spiral spring 26 within it against moisture, and it consists of the housing open at both ends and provided with an interior shoulder 27, against which one end of the spring bears. The bolt 23 of the plate 21 extends through the upper end of the housing and through the spiral spring 26 and is provided with a nut which bears against the other end of the spring. After the plate 21 is secured in place upon the cap the lower end of the housing is sealed, as at 28, and around the upper end of the bolt, between the plate 21 and the cap, is placed a packing 29. It will thus be seen that water is prevented from getting into the housing at either end.

To remove from or fit the neck-yoke to the pole, the front end of the plate 21 is raised and the pin 20 is carried with it, thus permitting the eye 4 to be fitted into or withdrawn from the bifurcated end of the pole.

While I have herein shown my preferred construction, I wish it to be understood that I am not to be limited to this construction and that any changes in form, proportion, and minor details may be made within the scope of the appended claims without departing from the spirit of my invention.

Having thus described my invention, what I claim as new, and desire to secure by Letters Patent, is—

1. In a neck-yoke attachment, the combination with a pole, a bifurcated cap mounted on said pole, and a spring-pressed pin; of a neck-yoke having a swiveled eye member secured in the bifurcation by the spring-pressed pin, as and for the purpose set forth.

2. In a neck-yoke attachment, the combination with a pole member having a bifurcation opening into a socket which is the counterpart of half a disk; of a neck-yoke having an eye member, and means for connecting the members together, as and for the purpose set forth.

3. In a neck-yoke attachment, the combination with a pole; a bifurcated end of a neck-yoke having an eye member, and a segmental body portion formed in a circular arc, and means for securing the eye member within the bifurcated end of the pole, as and for the purpose set forth.

4. In a neck-yoke attachment, the combination with a pole provided with a cap having a bifurcation, a plate mounted on said cap provided with a spring-pressed pin, and a bolt for securing said plate to the cap; of a neck-yoke carrying an eye member secured within the bifurcation and held therein by the pin, as and for the purpose set forth.

5. In a neck-yoke attachment, the combination with a pole provided with a cap having a bifurcation, a plate mounted on said cap and provided with a pin, a bolt for securing the plate to said cap, and a spiral spring surrounding said bolt; of a neck-yoke carrying an eye member secured within the bifurcation and held therein by the pin, as and for the purpose set forth.

6. In a neck-yoke attachment, the combination with a pole provided with a cap having a bifurcation, a plate mounted on said cap provided with a spring-pressed pin, a bolt for securing the plate to said cap, a spring surrounding said bolt, and a water-tight housing in which said spring is mounted; of a neck-yoke carrying an eye member secured within the bifurcation and held therein by the pin, as and for the purpose set forth.

7. In a neck-yoke attachment, the combination with a pole provided with a bifurcation; of a swiveled member carried by the neck-yoke comprising an eye secured within the bifurcation, a segmental body portion, a bearing connected with said said body portion, an attaching-plate having an opening into which said bearing fits, and an arbor extending from said bearing, as and for the purpose set forth.

8. In a neck-yoke attachment, the combination with a pole provided with a bifurcation; of a swiveled member carried by the neck-yoke comprising an eye secured within the bifurcation, a segmental body portion, a bearing connected to said body, an arbor extending from said bearing, an attaching-plate having an opening into which said bearing fits, and means for holding the bearing within said opening, as and for the purpose set forth.

9. In a neck-yoke attachment, the combination with a pole provided with a bifurcation; of a swiveled member carried by the neck-yoke comprising an eye secured within the bifurcation, a segmental body portion, a bearing connected to said body, an arbor extending from said bearing, an attaching-plate having an opening into which said bearing fits, an annular projection on said plate, and means for holding the bearing within said opening, as and for the purpose set forth.

10. In a neck-yoke attachment, the combination with a pole member provided with a bifurcation; of a neck-yoke provided with a plurality of sockets, an eye member carried by the neck-yoke comprising an eye secured within the bifurcation, a segmental body portion, a cone-shaped bearing, an attaching-plate provided with an opening, an annular projection surrounding said opening and adapted to fit into one of said sockets, means for securing said bearing within said opening, an arbor extending from said bearing, and a bushing mounted within another of said sockets and adapted to receive said arbor, as and for the purpose set forth.

11. In a neck-yoke attachment, the combination with a pole having a cap provided with a socket and having its end bifurcated for a distance less than the depth of said socket, a spring-pressed plate mounted on said cap, and a pin carried by said plate working in said socket; of a neck-yoke having a swiveled eye member secured within the bifurcation by the pin, and means for securing said member to said neck-yoke, as and for the purpose set forth.

12. In a neck-yoke attachment, the combination with a pole having a cap, a bifurcation in said cap opening into a socket having the form of a circular arc and having the end of one branch of the bifurcation rounded forming an arc of equal degree with that forming the socket and with crowns of said arcs at a distance from each other equal to the diameter of a complete circle of said arcs; of a neck-yoke provided with an eye member comprising an eye substantially commensurate with the bifurcation and socket in which it is secured by the pin, and a segmental body portion one surface of which forms a circular arc corresponding to the rounded end of the cap, as and for the purpose set forth.

In testimony whereof I affix my signature in presence of two witnesses.

ELIAS CLARK RISHEL.

Witnesses:
VIN CRANDALL,
L. W. EIGHORNY.